United States Patent

Mayama et al.

Patent Number: 5,283,142
Date of Patent: Feb. 1, 1994

[54] IMAGE-HOLDING MEMBER, AND ELECTROPHOTOGRAPHIC APPARATUS, APPARATUS UNIT, AND FACSIMILE MACHINE EMPLOYING THE SAME

[75] Inventors: Shinya Mayama, Yamato; Naoto Fujimura, Yokohama; Kiyoshi Sakai, Hachioji; Noriko Ohtani; Katsumi Aoki, both of Yokohama; Noriyoshi Ogawa, Toyonaka; Satoshi Kanayama, Takarazuka, all of Japan

[73] Assignee: Canon Kabushiki Kaisha, Tokyo, Japan

[21] Appl. No.: 836,718

[22] Filed: Feb. 19, 1992

[30] Foreign Application Priority Data

Feb. 21, 1991 [JP] Japan .................................. 3-27152

[51] Int. Cl.$^5$ .................. G03G 5/047; G03G 5/147; G03G 15/22; H04N 1/23
[52] U.S. Cl. ........................................ 430/58; 430/66; 430/67; 430/96; 355/211; 358/300; 358/302
[58] Field of Search ...................... 430/58, 66, 67, 96; 355/211; 358/300, 304

[56] References Cited

U.S. PATENT DOCUMENTS 5,208,127 5/1993 Terrell et al. ...................... 430/66 X
5,208,128 5/1993 Terrell et al. ...................... 430/66 X

FOREIGN PATENT DOCUMENTS

| 356246 | 2/1990 | European Pat. Off. . |
| 385732 | 9/1990 | European Pat. Off. . |
| 411532 | 2/1991 | European Pat. Off. . |
| 0429116 | 5/1991 | European Pat. Off. .............. 430/66 |
| 61-132954 | 6/1986 | Japan . |
| 61-62039 | 3/1987 | Japan . |
| 240656 | 9/1990 | Japan ................................. 430/96 |

OTHER PUBLICATIONS

Patent Abstracts of Japan, vol. 12, No. 68 (P-672) [2915] Mar. 3, 1988.
Patent Abstracts of Japan, vol. 13, No. 563 (P-975) [3911] Dec. 14, 1989.

Primary Examiner—Roland Martin
Attorney, Agent, or Firm—Fitzpatrick, Cella, Harper & Scinto

[57] ABSTRACT

The present invention provides an image-holding member which comprises an electroconductive support and a resin layer formed on the support, wherein the surface layer of the image-holding member contains a copolymer having the structure units represented by the formulas [I] and [II]:

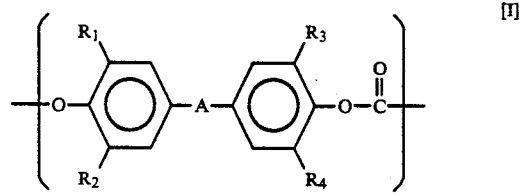

where A is a linear, branched or cyclic alkylidene group of 1 to 10 carbon atoms, an aryl-substituted alkylidene group, arylene-dialkylidene group, —O—, —S—, —CO—, —SO—, or —SO$_2$—; and R$_1$, R$_2$, R$_3$, and R$_4$ are respectively hydrogen, halogen, or an alkyl or alkenyl group of 1 to 4 carbons;

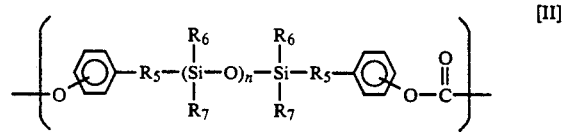

where R$_5$ is an alkylene or alkylidene group of 2 to 6 carbons; R$_6$ and R$_7$ are respectively an alkyl group of 1 to 3 carbons, a phenyl or substituted phenyl group; and n is an integer of from 1 to 200, and the copolymer containing the structure unit of the formula [II] in an amount of from 0.1 to 50% by weight Of the total weight of the copolymer.

19 Claims, 1 Drawing Sheet

IMAGE-HOLDING MEMBER, AND ELECTROPHOTOGRAPHIC APPARATUS, APPARATUS UNIT, AND FACSIMILE MACHINE EMPLOYING THE SAME

BACKGROUND OF THE INVENTION

1. Field of the Invention

The present invention relates to an image-holding member employing a resin having a specified structure, more particularly to an image-holding member having excellent surface slipperiness and excellent durability.

The present invention also relates to an electrophotographic apparatus, an apparatus unit, and a facsimile machine employing the above image-holding member.

2. Related Background Art

A typical image-holding member is an electrophotographic photosensitive member. In recent years, many types of electrophotographic photosensitive members employing an organic photoconductive material have been reported and have come to be practically used because of their non-pollution causing property, high productivity, ease of material design, and expected future growth. Naturally, the electrophotographic photosensitive members are required to have suitable electrical, mechanical, optical and other properties depending on the electrophotographic process employing the members. In particular, the photosensitive members which are used repeatedly are required to be durable against the external electrical and mechanical force such as corona discharge, imagewise exposure, toner development, transfer onto paper, and cleaning treatment which act on the surface of the photosensitive member. Specifically, required is the durability not causing the deterioration with ozone generated on corona charging, such as decrease of the sensitivity and the potential, and increase of the residual potential, not receiving the abrasion and scratching on the surface by the friction during image-transfer and cleaning.

The surface of the photosensitive member is generally made of an extremely thin resin layer, so that the properties of the surface resin is of great importance. Polycarbonate resins having bisphenol A skeleton have been used as the resin satisfying the aforementioned conditions. The polycarbonate resins, however, do not completely satisfy all of the electrophotographic properties required to the resin for the photosensitive member. For example, a bisphenol A type polycarbonate resin, which has relatively high crystallinity, is liable to become gel, when solubilized in a solvent. Therefore, the electrophotographic photosensitive member employing this resin tends to give inferior electrophotographic characteristics Or to result in low productivity. This resin shows low slipperiness to a usual elastic blade of the cleaning means. Therefore, when this resin is used as the surface layer of a photosensitive member, the reversal of the cleaning blade and thus incomplete cleaning tends to occur, and the abrasion of the surface of the member is liable to be accelerated by the relatively high frictional resistance of the transferred material in the image transfer step.

In one method for solving the above problems, a certain component is introduced to the polycarbonate structure to form a copolymer for the purpose of lowering the crystallinity and improving the liquid storability (Japanese Laid-Open Patent Application No.61-62039, etc.). In this method, however, according to the copolymerized component, the electrophotographic characteristics, the mechanical properties of the copolymer, or coating application property may sometimes be impaired. Therefore, this method is not necessarily satisfactory.

In another method, a surfactant mainly composed of a polydimethylsiloxane resin is added to the resin to improve the coating application property. In this method, however, even an extremely small amount of the surfactant may cause a remarkable increase of the residual potential. In particular, the addition of a less compatible organosiloxane derivative deteriorates the optical properties, the image quality, or the durability of the coating layer.

In still another method, polyorganosiloxane block is incorporated into the polycarbonate resin by copolymerization to improve the above-mentioned properties as disclosed in Japanese Laid-Open Patent Application No.61-132954. In this method, as the polymer itself exhibits slipperiness, it hardly changes during repeated use. However, the polymer cannot be steadily produced because the solution thereof in a solvent becomes turbid in white, and a mixture of a homopolymer of the polyorganosiloxane with a homopolymer of the employed polyhydric phenol is formed simultaneously.

In still another method, a bisphenol Z type polycarbonate resin is used to improve the above properties. Electrophotographic photosensitive members are being investigated further to meet requirement for higher image quality and higher durability in recent years.

Similar problems are involved also in other types of image-holding members such as those used for electrostatic recording mediums and image-holding members for engraving.

SUMMARY OF THE INVENTION

The present invention intends to solve the problems involved in image-holding members having a polycarbonate resin surface layer, providing a novel image-holding member which is improved in slipperiness and abrasion-resistance and has excellent mechanical and electrical characteristics, to give excellent image-forming characteristics, and high productivity.

The present invention also intends to provide an electrophotographic apparatus, an apparatus unit, and a facsimile machine employing the above image-holding member.

The present invention provides an electrophotographic image-holding member, comprising an electroconductive support and a resin layer formed on the support, the surface layer of the image-holding member being formed from a copolymer having the structure units represented by the formulas [I] and [II]:

[I]

where A is a linear, branched or cyclic alkylidene group of 1 to 10 carbon atoms, an aryl-substituted alkylidene group, arylene dialkylidene group, —O—, —S—, —CO—, —SO—, or —SO$_2$—; and R$_1$, R$_2$, R$_3$; and R$_4$ are respectively hydrogen, halogen, or an alkyl or alkenyl group of 1 to 4 carbons;

where $R_5$ is an alkylene or alkylidene group of 2 to 6 carbons; $R_6$ and $R_7$ are respectively an alkyl group of 1 to 3 carbons a phenyl or substituted phenyl group: and n is an integer of from 1 to 200, and the copolymer containing the structure unit of the formula [II] in an amount of from 0.1 to 50 % by weight of the total weight of the copolymer.

The present invention also provides an electrophotographic apparatus, an apparatus unit, and a facsimile machine employing the image-holding member described above.

DESCRIPTION OF THE PREFERRED EMBODIMENT

The surface layer of the image-holding member of the present invention is formed from a copolymer having the structure units represented by the formulas [I] and [II]:

where A is a linear, branched or cyclic alkylidene group having 1 to 10 carbon atoms, an aryl-substituted alkylidene group, arylene-dialkylidene group, —O—, —S—, —CO—, —SO—, or —SO$_2$—; and $R_1$, $R_2$, $R_3$, and $R_4$ are respectively hydrogen, halogen, or an alkyl or alkenyl group of 1 to 4 carbons; and where $R_5$ is an alkylene or alkylidene group of 2 to 6 carbons; $R_6$ and $R_7$ are respectively an alkyl group of 1 to 3 carbons, a phenyl or substituted phenyl group; and n is an integer of from 1 to 200; and the copolymer containing the structure unit of the formula [II] in an amount of from 0.1 to 50% by weight of the total weight of the copolymer.

The copolymer employed in the present invention may be in any molecular weight range, provided that the copolymer has a suitable viscosity for forming a film in a desired thickness on application of the copolymer. In view of the mechanical characteristics, however, the viscosity-average molecular weight of the copolymer is preferably in the range of from 10,000 to 100,000, more preferably from 20,000 to 40,000.

The copolymer of the present invention may be prepared by interfacial polymerization of a bisphenol represented by the formula [III]:

wherein $R_1$, $R_2$, $R_3$, and $R_4$ are as defined above; and with another bisphenol represented by the general formula [IV]:

wherein $R_5$, $R_6$, and $R_7$ are as defined above; in the presence of phosgene, a carbonate ester, or a chloroformate.

The structural unit represented by the formula [II] in the present invention is contained in the copolymer in an amount of from 0.1 to 50%, preferably from 0.1 to 30 %, by weight of the total copolymer. The symbol n is an integer of from 1 to 200, preferably from 5 to 100. The group $R_5$ includes ethylene, propylene, isopropylene, butylene, pentylene, and the like, of which ethylene, propylene, and isopropylene are particularly preferred.

The specific examples of the bisphenol represented by the formula [III] are shown below without limiting the invention.

Exemplified compound No.

-continued

Exemplified compound No.

5

6

7

8

9

10

11

12

-continued

Exemplified compound No.

13

14

15

16

17

18

19

20

21

-continued

Exemplified compound No.

Of the compounds above, particularly preferred are the exemplified compounds of Nos. 3, 8, 16, 19, and 21.

The specific examples of the bisphenol represented by the formula [IV] are shown below without limiting the invention.

Exemplified compound No.

-continued

Exemplified compound No.

SYNTHESIS EXAMPLE

Sodium hydroxide (3.8 kg) was dissolved in 45 liters of water. Therein, 7.2 kg of 2,2-bis(4-hydroxyphenyl)-cyclohexane (viscosity-average molecular weight: $2.20 \times 10^4$), 1.5 kg of a polydimethylsiloxane derivative (X-22-165B. made by Shi-Etsu Chemical Co.. Ltd.) represented by the structural formula below:

and 8 g of sodium hydrosulfite were dissolved at a temperature of 20° C. Thereto 32 liters of methylene chloride was added, and with stirring 158 g of p-t-butylphenol was added, and subsequently 3.5 kg of phosgene was bubbled therein for 60 minutes. After completion of the introduction of the phosgene, the reaction solution was agitated vigorously and was emulsified. After the emulsification, 8 g of triethylamine was added and with stirring the polymerization was allowed to proceed for approximately one hour.

The polymerization liquid was separated into an aqueous phase and an organic phase. The organic phase was neutralized with phosphoric acid, and washed repeatedly with water until the pH of the washing water became neutral. Then 35 liters of isopropanol was added to the organic phase to precipitate the resulting polymer. The precipitate was collected by filtration and was dried to obtain a white powdery copolymer having a viscosity-average molecular weight of $2.8 \times 10^4$ of the structural formula below. The copolymerization ratio is based on weight. The copolymer composition was measured by IR absorption spectrometry.

The use of the copolymer of the present invention gives a coating film having satisfactory slipperiness without lowering &he electrical and mechanical properties. Moreover, the copolymer is highly soluble in a common solvent such as tetrahydrofuran, dioxane, cyclohexanone, benzene, toluene, xylene, monochlorobenzene, dichloromethane, and dichlorobenzene, and a mixture thereof, and does not cause the short pot-life by relation. Accordingly, the copolymer is excellent in electrophotographic characteristics, stability in the production and in quality, and so forth.

In the present invention, the copolymer may comprise two or more of the copolymerizing components having the structure of the formula [I], and also may comprise two or more of the copolymerizing components having the structure of the formula [II].

In the present invention, two or more of the aforementioned copolymers may be used in combination. Furthermore, the copolymer may be used in combination with another resin. The resin which may be in combination used includes polyester resins, acrylic resins, polyethylene resins, polypropylene resins, polyvinylcarbazole resins, phenoxy resins, polycarbonate resins, polyvinylbutyral resins, polystyrene resins, polyvinyl acetate resins, polysulfone resins, polyarylate resins, vinylidene chloride-acrylonitrile copolymer resins, and the like.

The present invention, in particular the electrophotographic photosensitive member, of the present invention is described below in detail.

The copolymer of the present invention is contained in the surface layer of the electrophotographic photosensitive member, and the surface layer may be a photosensitive layer itself or a surface-protecting layer provided on the photosensitive layer.

The photosensitive layer may either be of a single layer type which contains a charge-generating substance and a charge-transporting substance in one and the same layer, or be of a lamination type which has functionally separate layers of a charge-generating layer containing a charge-generating substance and a charge-transporting layer containing a charge-transporting substance.

The charge-generating layer may be formed by applying a liquid dispersion containing a charge-generating substance and a binder resin, and drying it. The charge-generating substance includes azo pigments such as Sudan Red and Dian Blue; quinone pigments such as pyrene quinone and anthoanthorone; quinocyanine pigments; perylene pigments; indigo pigments such as indigo and thioindigo; azulenium salt pigments; phthalocyanine pigments such as copper phthalocyanine, and the like. The binder resin contains at least the copolymer of the present invention in the case where the charge-generating layer is the surface layer. In the case where the charge-generating layer is not the surface layer, a resin other than the copolymer of the present invention may be used. This resin is the same as those mentioned above.

The ratio of the charge-generating substance to the binder resin is in the range of from 1:5 to 5:1, preferably from 1:2 to 3:1 by weight. The thickness of the charge-generating layer is preferably not more than 5 μm, more preferably in the range of from 0.05 to 2 μm.

The charge-transporting substance contained in the charge-transporting layer includes polycyclic aromatic compounds such as biphenylene, anthracene, pyrene, and phenanthrene; nitrogen containing cyclic compound such as indole, carbazole, oxadiazole, and pyrazoline; hydrazone compounds; styryl compounds, and the like.

Since the charge-transporting substance is generally inferior in film-forming properties, it is used after dissolved in a binder resin. As the binder resin, the copolymer of the present invention is used in the case where the charge-transporting layer is the surface layer of the photosensitive member. In cases where the charge-transporting layer is not the surface layer, another resin may be used without use of the copolymer of the present invention. The resin is the same as those mentioned above.

The charge-transporting layer may be formed by dissolving the aforementioned charge-transfer substance and a binder resin in a suitable solvent, applying the resulting solution onto a support, and drying it. The mixing ratio of the charge-transporting substance to the binder resin is preferably in the range of from 3:1 to 1:3, more preferably from 2:1 to 1:2. The thickness of the charge-transporting layer is preferably from 5 to 40 μm, more preferably from 10 to 30 μm.

A single layer type of a photosensitive member may be prepared by dispersing and dissolving in a suitable solvent a charge-generating substance, a charge-transporting substance, and a binder resin such as mentioned above and applying the resulting liquid mixture on a support, and drying it.

In the case where the photosensitive layer is the surface layer, the binder resin comprises at least the copolymer of the present invention, while in the case where the photosensitive layer is not the surface layer, another resin may be used without the copolymer of the present invention. The resin is the same as those mentioned above.

The thickness of the photosensitive layer is preferably in the range of from 5 to 40 μm, more preferably from 10 to 30 μm.

A surface-protecting layer may be provided on the photosensitive layer in the present invention for the purpose of protecting the photosensitive layer against any adverse mechanical or chemical effect from the outside. This protecting layer contains at least the copolymer of the present invention, but may further contain another resin. This resin is the same as those mentioned above. The surface-protecting layer may be composed of the resin only, or otherwise may contain the aforementioned charge-transporting substance or an electroconductive substance like electroconductive powder. The electroconductive powder includes powder, scaly powder, and staple of metals such as aluminum, copper, nickel, silver, etc.; electroconductive metal oxides such as antimony oxide, indium oxide, tin oxide, etc.; electroconductive polymers such as polypyrrole, polyaniline, polymeric electrolyte, etc.; carbon black, carbon fiber, graphite powder, organic and inorganic electrolyte, and electroconductive powder derived by coating of the above electroconductive substance.

The thickness of the protecting layer is decided in consideration of electrophotographic properties and durability, and is preferably in the range of from 0.2 to 15 μm, more preferably from 0.5 to 15 μm.

Between the electroconductive support and the photosensitive layer, a subbing layer may be provided which has both a barrier function and an adhesive function. The material for the subbing layer includes casein, polyvinyl alcohols, nitrocelluloses, ethylene acrylic acid copolymers, polyvinylbutyrals, phenol resins, polyamides (nylon 6, nylon 66, nylon 610, copolymer nylon, alkoxymethylated nylon, etc.). polyurethanes, gelatin, aluminum oxide, and the like. The thickness of the subbing layer is preferably in the range of from 0.1 to 10 μm, more preferably from 0.1 to 5 μm.

Furthermore, between the support and the subbing layer in the present invention, a coat may be applied to cover surface defects of the support, or otherwise an electroconductive layer may be provided to prevent occurrence of interference fringes in use of laser light as an image input means. The electroconductive layer may be formed by applying on a support a liquid dispersion of electroconductive powder such as carbon black, appropriate metal, or metal oxide in a suitable binder, followed by drying. The thickness of the electroconductive layer is preferably in the range of from 5 to 40 μm, more preferably from 10 to 30 μm.

The layers described above may respectively be applied by a coating method such as dip coating, spray coating, spinner coating, bead coating, blade coating, and beam coating.

The electroconductive support employed in the present invention includes metals which are electroconductive by themselves, such as aluminum, aluminum alloys, copper, zinc, stainless steel, vanadium, molybdenum, chromium, titanium, nickel, indium, gold, and platinum; plastics, paper, and the like having electroconductive layer formed by vapor-deposition of aluminum, aluminum alloys, indium oxide, tin oxide, indium oxide-tin oxide alloy, etc.; plastics or paper impregnated with an electroconductive particulate material; plastics containing an electroconductive polymer.

The support is preferably in a shape suitable for the electrophotographic apparatus employing it, and may be in a shape of a drum, a sheet, or a belt.

The image-holding member of the present invention is applicable generally to electrophotographic apparatus such as copying machines, laser printers, LED printers, liquid crystal shutter type printer, and the like. Furthermore the image-holding member is widely applicable to apparatuses for display, recording, light printing, engraving, facsimile, and the like, which employ electrophotographic techniques.

Figure 1:
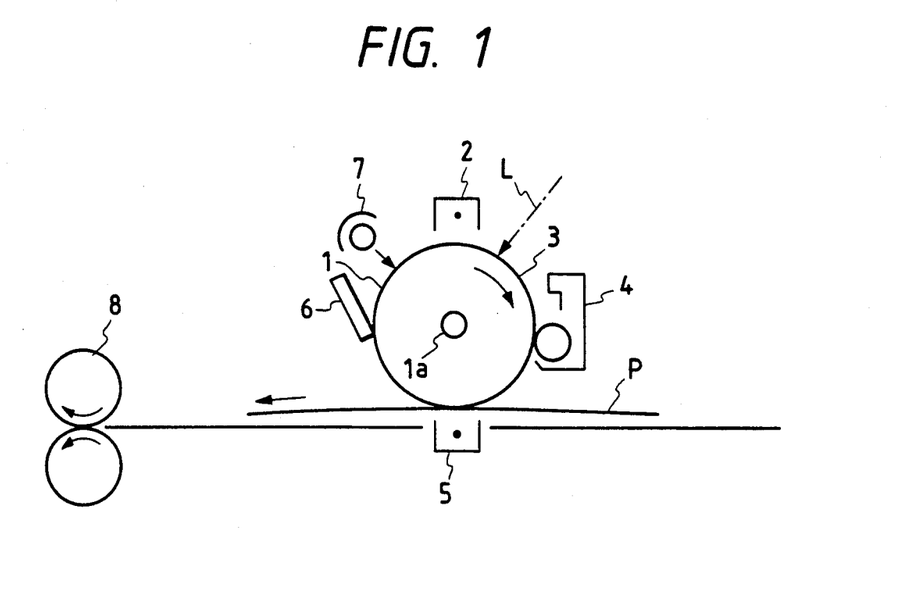
FIG. 1 illustrates the outline of a constitution of an electrophotographic apparatus employing the image-holding member of the present invention.

FIG. 1 shows a schematic diagram of a transfer type electrophotographic apparatus employing the electrophotographic photosensitive member of the present invention.

In FIG. 1, a drum type photosensitive member 1 serves as an image carrier being driven to rotate around the axis 1a in the arrow direction at a predetermined peripheral speed. The photosensitive member 1 is charged positively or negatively at the peripheral face uniformly during the rotation by an electrostatic charging means 2, and then exposed to image-exposure light L (e.g. slit exposure, laser beam-scanning exposure, etc.) at the exposure area 3 with an image-exposure means (not shown in the figure), whereby electrostatic latent images are sequentially formed on the peripheral surface in accordance with the exposed image.

The electrostatic latent image is developed with a toner by a developing means 4. The toner-developed images are sequentially transferred by a transfer means 5 onto a surface of a transfer-receiving material P which is fed between the photosensitive member 1 and the transfer means 5 synchronously with the rotation of the photosensitive member 1 from a transfer-receiving material feeder not shown in the figure.

The transfer-receiving material P having received the transferred image is separated from the photosensitive member surface, and introduced to an image fixing means 8 for fixation of the image and sent out from the copying machine as a duplicate copy.

The surface of the photosensitive member 1, after the image transfer, is cleaned with a cleaning means 6 to remove any remaining un-transferred toner, and is treated for charge-elimination with a pre-exposure means 7 for repeated use for image formation.

The generally employed charging means 2 for uniformly charging the photosensitive member 1 is a corona charging apparatus. The generally employed transfer means 5 is also a corona charging means. In the electrophotographic apparatus, two or more of the constitutional elements of the above described photosensitive member, the developing means, the cleaning means, etc. may be integrated into one apparatus unit, which may be made removable from the main body of the apparatus. For example, at least one of an electrostatic charging means, a developing means, and a cleaning means is combined with the photosensitive member into one unit removable from the main body of the apparatus by aid of a guiding means such as a rail in the main body of the apparatus. An electrostatic charging means and/or a developing means may be combined with the aforementioned apparatus unit.

In the case where the electrophotographic apparatus is used as a copying machine or a printer, the optical image exposure light L is projected onto the photosensitive member as reflected light or transmitted light from an original copy, or otherwise the information read out by a sensor from an original is signalized and light L is projected by scanning with a laser beam, driving an LED array, or driving a liquid crystal shutter array according to the signal onto a photosensitive member.

Figure 2:
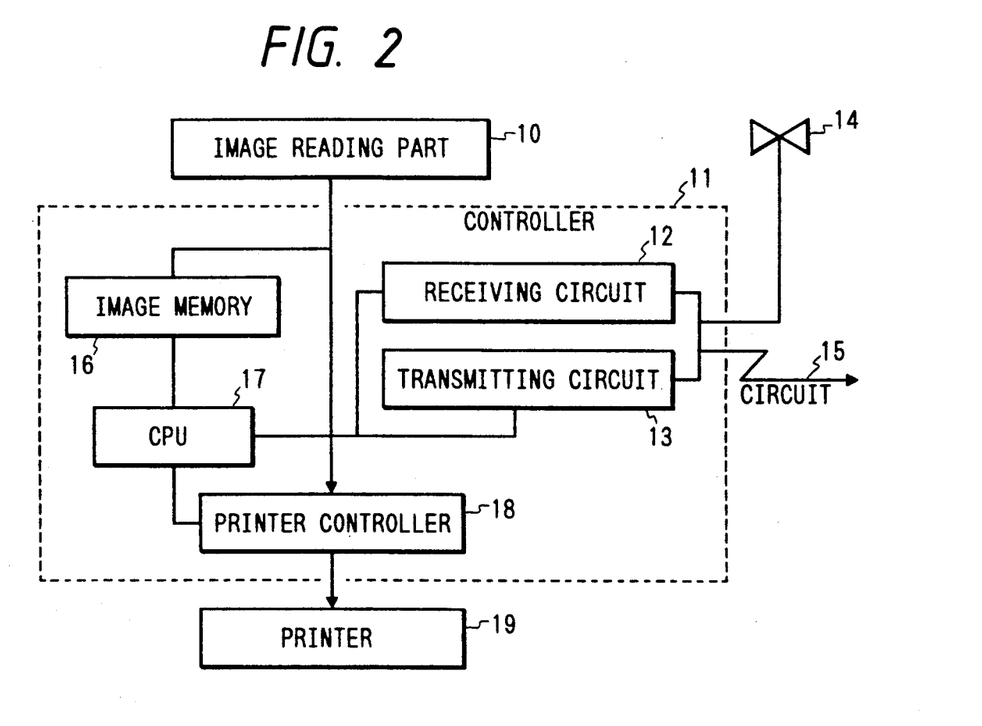
FIG. 2 illustrates an example of a block diagram of a facsimile employing the image-holding member of the present invention.

In the case where the electrophotographic apparatus is used as a printer of a facsimile machine, the optical image exposure light L is for printing the received data. FIG. 2 is a block diagram of an example of this case.

A controller 11 controls an image reading part 10 and a printer 19. The entire of the controller 11 is controlled by a CPU 17. Readout data from the image reading part is transmitted through a transmitting circuit 13 to the other communication station. Data received from the other communication station is transmitted through a receiving circuit 12 to a printer 19. The image data is stored in image memory. A printer controller 18 controls a printer 19. The numeral 14 denotes a telephone set.

The image received through a circuit 15, namely image information from a remote terminal connected through the circuit, is demodulated by the receiving circuit 12, treated for decoding of the image information in CPU 17, and successively stored in the image memory 16. When at least one page of image information has been stored in the image memory 16, the images are recorded in such a manner that the CPU 17 reads out the one page of image information, and sends out the decoded one page of information to the printer controller 18, which controls the printer 19 on receiving the one page of information from CPU 17 to record the image information.

During recording by the printer 19, the CPU 17 receives the subsequent page of information.

Images are received and recorded in the manner as described above.

The present invention is described in more detail by reference to examples.

EXAMPLE 1

An electroconductive paint was prepared by dispersing 50 parts of electroconductive powdery titanium oxide coated with a tin oxide containing 10% antimony oxide, 25 parts of a phenol resin, 20 parts of methylcellosolve, 5 parts of methanol, and 0.002 part of a silicone oil (a polydimethylsiloxanepolyoxyalkylene copolymer, average molecular weight: 3000) for two hours with a sand mill employing glass beads of 1 mm diameter. The resulting electroconductive paint was applied onto an aluminum sheet by means Of a wire bar, and dried at 140° C. for 30 minutes to provide an electroconductive layer of 20 μm thick.

A subbing layer paint was prepared by dissolving 5 parts of N-methoxymethylated nylon in 95 parts of methanol. The resulting paint was applied on the above-described electroconductive layer, and dried at 100° C. for 20 minutes to provide a subbing layer of 0.6 μm thick. Subsequently, a liquid dispersion for a charge-generating layer was prepared by dispersing 3 parts of the disazo pigment having the structure shown below:

and 2 parts of polyvinylbenzal (benzalaton degree: 80%, weight average molecular weight: 11000) in 35 parts of cyclohexanone with a sand mill employing glass beads of 1 mm diameter for 12 hours, and adding to the resulting dispersion 60 parts of methyl ethyl ketone. This liquid dispersion was applied onto the above-mentioned subbing layer with a wire bar, and dried at 80° C. for 20 minutes to provide a charge-generating layer of 0.2 μm thick.

Subsequently, 10 parts of the styryl compound of the formula below as the charge-transporting substance:

and 10 parts of the copolymer of the formula below having a viscosity-average molecular weight of $2.10 \times 10^4$ (hereinafter the copolymerization ratio being based on weight) as the binder resin:

were dissolved in a solvent mixture of 20 parts of dichloromethane and 40 parts of monochlorobenzene. This solution was applied on the above-mentioned charge-generating layer with a wire bar, and dried at 120° C. for 60 minutes to provide a charge-transporting layer of 18 μm thick. Thus a photosensitive member was prepared.

This photosensitive member was subjected to a rotational taper abrasion test by means of an abrasion tester No.101 (made by Yasuda Seiki K.K.). Consequently, no abrasion weight loss was observed at 1000 times of friction with a load of 500 g, the abrasion resistance being excellent. Further, the photosensitive member was tested for sliding resistance to a cleaning urethane blade with a load of 10 g by means of a surface property tester (HEIDON-14, made by Shinto Kagaku K.K.). As a result, the output value on the chart recorder was 100 mV. In this measurement, a lower output value of the chart recorder shows a lower sliding friction resistance, namely higher slipperiness. The results are shown in Table 1.

EXAMPLE 2

A photosensitive member was prepared and evaluated in the same manner as in Example 1 except that the copolymer (viscosity-average molecular weight being 2.07×10⁴) having the structure of the formula below was used as the binder resin. The results are shown in Table 1.

was used as the binder resin. The results are shown in Table 1.

EXAMPLE 3

A photosensitive member was prepared and evaluated in the same manner as in Example 1 except that the copolymer (viscosity-average molecular weight being 3.05×10⁴) having the structure of the formula below was used as the binder resin. The results are shown in Table 1.

EXAMPLE 4

A photosensitive member was prepared and evaluated in the same manner as in Example 1 except that the copolymer (viscosity-average molecular weight being 4.05×10⁴) having the structure of the formula below was used as the binder resin. The results are shown in Table 1.

EXAMPLE 5

A photosensitive member was prepared and evaluated in the same manner as in Example 1 except that the copolymer (viscosity-average molecular weight being 2.03×10⁴) having the structure of the formula below was used as the binder resin. The results are shown in Table 1.

EXAMPLE 6

A photosensitive member was prepared and evaluated in the same manner as in Example 1 except that the disazo pigment represented by the formula below was used in place of the charge-generating substance of Example 1:

and the hydrazone represented by the formula below was used as the charge-transporting substance.

copolymer (viscosity-average molecular weight being $2.10 \times 10^4$) having the structure of the formula below was used as the binder resin. The results are shown in Table 1.

EXAMPLE 8

An electrophotographic photosensitive member was prepared and evaluated in the same manner as in Example 1 except that the disazo pigment having the formula below was used as the charge-generating substance. The results are shown in Table 1.

The results are shown in Table 1.

EXAMPLE 7

A photosensitive member was prepared and evaluated in the same manner as in Example 6 except that the

EXAMPLE 9

An electrophotographic photosensitive member was prepared and evaluated in the same manner as in Example 1 except that the disazo pigment having the formula below was used as the charge-generating substance. The results are shown in Table 1.

EXAMPLE 10 to 14

A photosensitive members were prepared and evaluated in the same manner as in Example 1 except that the copolymers having the structures below were used respectively as the binder.

(Copolymer in Example 10)

Viscosity-average molecular weight: $2.30 \times 10^4$ (Copolymer in Example 11)

Viscosity-average molecular weight: $2.15 \times 10^4$ (Copolymer in Example 12)

Viscosity-average molecular weight: $3.03 \times 10^4$ (Copolymer in Example 13)

Viscosity-average molecular weight: $4.01 \times 10^4$

(Copolymer in Example 14)

Viscosity-average molecular weight: $5.23 \times 10^4$ The results are shown in Table 1.

EXAMPLE 15

A photosensitive member was prepared and evaluated in the same manner as in Example 1 except that the binder resin having the structure shown by the formula below was used. The results are shown in Table 1.

Viscosity-average molecular weight: $2.89 \times 10^4$

COMPARATIVE EXAMPLE 1

A photosensitive member was prepared and evaluated in the same manner as in Example 1 except that the polymer having the structure shown by the formula below was used as the binder resin. The results are shown in Table 1.

Viscosity-average molecular weight: $2.5 \times 10^4$

COMPARATIVE EXAMPLE 2

A photosensitive member was prepared and evaluated in the same manner as in Example 1 except that the polymer having the structure shown by the formula below was used as the binder resin.

Viscosity-average molecular weight: $1.92 \times 10^4$
The results are shown in Table 1.

TABLE 1

|  | Abrasion loss (mg) | Sliding friction resistance (mV) |
| --- | --- | --- |
| Example 1 | 0.00 | 100 |
| Example 2 | 0.02 | 95 |
| Example 3 | 0.05 | 220 |
| Example 4 | 0.00 | 90 |
| Example 5 | 0.00 | 80 |
| Example 6 | 0.01 | 85 |
| Example 7 | 0.03 | 80 |
| Example 8 | 0.00 | 80 |
| Example 9 | 0.01 | 85 |
| Example 10 | 0.06 | 85 |
| Example 11 | 0.05 | 100 |
| Example 12 | 0.02 | 90 |
| Example 13 | 0.04 | 90 |
| Example 14 | 0.00 | 80 |
| Example 15 | 0.06 | 95 |
| Comparative Example 1 | 1.03 | 3000 |
| Comparative Example 2 | 1.25 | 3500 |

EXAMPLE 16

A photosensitive member was prepared in the same manner as in Example 1 except that the electroconductive support was an aluminum drum of 80 mm diameter, the paint was applied by a dipping method, and the charge-transporting substance was the compound having the structure shown by the formula below.

This photosensitive member was mounted on a color copying machine (CLC-500, made by Canon K.K.) comprising apparatus for processes of charging, light-exposure, development, image-transfer, and cleaning. Images were formed on the photosensitive member repeatedly to test the durability of the photosensitive member, and occurrence of reversal of the cleaning blade causing image defects. After the durability test of copying 1000 sheets, neither defect nor abrasion was observed. Even after the 10000 sheet durability test, satisfactory images were formed without filming, insufficient cleaning, and reversal of the cleaning blade.

EXAMPLE 17

A photosensitive member was prepared in the same manner as in example 16 except that an aluminum drum of 30 mm diameter was used and the charge-generating substance and the charge-transporting substance of Example 6 were used.

This photosensitive member was visually evaluated using a laser printer (LBP-SX, made by Canon). During the 5000 sheet durability test, no reversal of the cleaning blade and no image defect caused by a scratch on the surface of the photosensitive member was observed.

EXAMPLE 18

A photosensitive member was prepared and evaluated in the same manner as in Example 17 except that the binder resin was the copolymer used in Example 15.

As a result, during the 5000 sheet durability test, no reversal of the cleaning blade and no image defect caused by a scratch on the surface of the photosensitive member was observed.

COMPARATIVE EXAMPLE 3

A photosensitive member was prepared and evaluated in the same manner as in Example 16 except that the binder resin was the one used in Comparative Example 1.

The slipperiness of the photosensitive member was not sufficient. Consequently, during the 1000 sheet durability test, scratches were formed on the surface of the photosensitive member owing to the friction with the cleaning blade. The cleaning blade was liable to be reversed, particularly in the early stage of the durability test. With the progress of the durability test, the reproducibility of small dot became lower and the image quality became lower owing to the scratches made on the surface of the photosensitive member. At the end of the 10000 sheet durability test, the film thickness decreased by 8 μm.

EXAMPLE 19

A coating liquid for a protecting-layer was prepared by dissolving 5 parts of the copolymer used in Example 1 in 95 parts of chlorobenzene. This coating liquid was applied by spray coating onto the photosensitive member prepared in the same manner as in Comparative Example 3, and was dried at 120° C. for 60 minutes to provide a surface-protecting layer of 2.5 μm thick. The resulting photosensitive member was evaluated in the same manner as in Example 16. Even after the 10000 sheet durability test, the surface slipperiness was satisfactory, and neither the lowering of the image quality nor the reversal of the cleaning blade was observed.

EXAMPLE 20

A photosensitive member was prepared and evaluated in the same manner as in Example 19 except that, as the coating liquid for the protecting-layer, a dispersion was used which was composed of 2 parts of fine powdery tin oxide, 10 parts of the copolymer used in Example 1, and 100 parts of monochlorobenzene. Even after the 10000 sheet durability test, the photosensitive member had satisfactory surface slipperiness, and neither the lowering of the image quality nor the reversal of the cleaning blade was observed.

EXAMPLE 21

A photosensitive member was prepared and evaluated in the same manner as in Example 19 except that, as the coating liquid for the protecting-layer, a paint was used which was composed of the charge-transporting substance represented by the structural formula below, 10 parts of the copolymer used in Example 1 and 100 parts of monochlorobenzene.

Even after 10000 sheets of the durability test, the photosensitive member had satisfactory surface slipperiness, and neither the lowering of the image quality nor the reversal of the cleaning blade was observed.

As described above, the present invention provides an image-holding member which has a sufficient mechanical strength, a sufficient surface slipperiness, and excellent image-forming properties.

What is claimed is:

1. An electrophotographic image-holding member, comprising an electroconductive support and a resin layer formed on the support, the surface layer of the image-holding member containing a copolymer having the structure units represented by the formulas [I] and [II]:

wherein A is a linear, branched or cyclic alkylidene group of 1 to 10 carbon atoms, an aryl-substituted alkylidene group, arylene-dialkylidene group, —O—, —S—, —CO—, —SO—, or —SO$_2$—; and R$_1$, R$_2$, R$_3$, and R$_4$ are respectively hydrogen, halogen, or an alkyl or alkenyl group of 1 to 4 carbons;

is provided where R$_5$ is an alkylene or alkylidene group of 2 to 6 carbons; R$_6$ and R$_7$ are respectively an alkyl group of 1 to 3 carbons, a phenyl or substituted phenyl group; and n is an integer of from 1 to 200, and the copolymer containing the structure unit of the formula [II] in an amount of from 0.1% to 50% by weight of the total weight of the copolymer.

2. An electrophotographic image-holding member according to claim 1, wherein the structural unit of the formula [I] is represented by the formula below:

3. An electrophotographic image-holding member according to claim 1, wherein the structural unit of the formula [I] is represented by the formula below:

4. An image-holding member according to claim 1, wherein the structural unit of the formula [I] is represented by the formula below:

5. An electrophotographic image-holding member according to claim 1, wherein the structural unit of the formula [I] is represented by the formula below:

6. An electrophotographic image-holding member according to claim 1, wherein the structural unit of the formula [I] is represented by the formula below:

7. An electrophotographic image-holding member according to claim 1, wherein the group $R_5$ is selected from an ethylene group, a propylene group, and an isopropylene group.

8. An electrophotographic image-holding member according to claim 1, wherein the surface layer is a photosensitive layer.

9. An electrophotographic image-holding member according to claim 8, wherein the photosensitive layer comprises a charge-generating layer and a charge-transporting layer.

10. An electrophotographic image-holding member according to claim 9, wherein the charge-transporting layer is the surface layer.

11. An electrophotographic image-holding member according to claim 9, wherein the charge-generating layer is the surface layer.

12. An electrophotographic image-holding member according to claim 8, wherein the photosensitive member is a single layer.

13. An electrophotographic image-holding member according to claim 1, wherein the surface layer is a protecting layer.

14. An electrophotographic image-holding member according to claim 1, wherein the image-holding member has a subbing layer between the electroconductive support and the resin layer.

15. An electrophotographic image-holding member according to claim 1, wherein the image-holding member has an electroconductive layer between the electroconductive support and the resin layer.

16. An electrophotographic apparatus, comprising an electrophotographic image-holding member, a means for forming an electrostatic latent image, a means for developing the electrostatic latent image formed, and a means for transferring a developed image onto a transfer-receiving material; said image-holding member comprising an electroconductive support and a resin layer formed on the support, the surface layer of the image-holding member being formed from a copolymer having the structure units represented by the formulas [I] and [II]:

where A is a linear, branched or cyclic alkylidene group of 1 to 10 carbon atoms, an aryl-substituted alkylidene group, arylene-dialkylidene group, —O—, —S—, —CO—, —SO—, or —SO$_2$—; and $R_1$, $R_2$, $R_3$, and $R_4$ are respectively hydrogen, halogen, or an alkyl or alkenyl group of 1 to 4 carbons;

where $R_5$ is an alkylene or alkylidene group of 2 to 6 carbons; $R_6$ and $R_7$ are respectively an alkyl group of 1 to 3 carbons, a phenyl or substituted phenyl group; and n is an integer of from 1 to 200, and the copolymer containing the structure unit of the formula [II] is provided in an amount of from 0.1 to 50% by weight of the total weight of the copolymer.

17. A device unit, comprising an electrophotographic image-holding member, a charging means, and a cleaning means; said image-holding member comprising an electroconductive support and a resin layer formed on the support, the surface layer of the image-holding member being formed from a copolymer having the structure units represented by the formulas [I] and [II]:

[I]

where A is a linear, branched or cyclic alkylidene group of 1 to 10 carbon atoms, an aryl-substituted alkylidene group, arylene-dialkylidene group, —O—, —S—, —CO—, —SO—, or —SO$_2$—; and $R_1$, $R_2$, $R_3$, and $R_4$ are respectively hydrogen, halogen, or an alkyl or alkenyl group of 1 to 4 carbons;

[II]

where $R_5$ is an alkylene or alkylidene group of 2 to 6 carbons; $R_6$ and $R_7$ are respectively an alkyl group of 1 to 3 carbons, a phenyl or substituted phenyl group; and n is an integer of from 1 to 200, and the copolymer containing the structure unit of the formula [II] is provided in an amount of from 0.1 to 50% by weight of the total weight of the copolymer, said unit holding integrally the image-holding member, the charging means, and the cleaning means, and being removable from the main body of an electrophotographic apparatus.

18. A device unit according to claim 17, wherein the unit comprises a developing means.

19. A facsimile machine, comprising an electrophotographs apparatus and an information-receiving means for receiving image information from a remote terminal: said electrophotographic apparatus comprising an electrophotographic image-holding member, said image-holding member comprising an electroconductive support and a resin layer formed on the support, the surface layer of the image-holding member being formed from a copolymer having the structure units represented by the formulas [I] and [II]:

[I]

where A is a linear, branched or cyclic alkylidene group of 1 to 10 carbon atoms, an aryl-substituted alkylidene group, arylene-dialkylidene group, —O—, —S—, —CO—, —SO—, or —SO$_2$—; and $R_1$, $R_2$, $R_3$, and $R_4$ are respectively hydrogen, halogen, or an alkyl or alkenyl group of 1 to 4 carbons;

[II]

where $R_5$ is an alkylene or alkylidene group of 2 to 6 carbons: $R_6$ and $R_7$ are respectively an alkyl group of 1 to 3 carbons, a phenyl or substituted phenyl group and n is an integer of from 1 to 200, and the copolymer containing the structure unit of the formula [II] is provided in an amount of from 0.1 to 50% by weight of the total weight of the copolymer.

* * * * *

UNITED STATES PATENT AND TRADEMARK OFFICE
CERTIFICATE OF CORRECTION

PATENT NO. : 5,283,142
DATED : February 1, 1994
INVENTOR(S) : SHINYA MAYAMA, ET AL.

Page 1 of 2

It is certified that error appears in the above-identified patent and that said Letters Patent is hereby corrected as shown below:

COLUMN 1

Line 42, "is" should read --are--.
　　Line 53, "Or" should read --or--.

COLUMN 3

Line 12, "carbons" should read --carbons,--.

COLUMN 8

Line 66, "&he" should read --the--.

COLUMN 9

Line 4, "relation." should read --gelation.--.
　　Line 68, "after" should read --after being--.

COLUMN 11

Line 5, "&he" should read --the--.

COLUMN 12

Line 1, "fixiation" should read --fixation--.
　　Line 40, "entire" should read --entirety--.

COLUMN 13

Line 12, "Of" should read --of--.

UNITED STATES PATENT AND TRADEMARK OFFICE
CERTIFICATE OF CORRECTION

PATENT NO. : 5,283,142
DATED : February 1, 1994
INVENTOR(S) : SHINYA MAYAMA, ET AL.

It is certified that error appears in the above-identified patent and that said Letters Patent is hereby corrected as shown below:

COLUMN 19

Line 15, "EXAMPLE 10 to 14" should read
--EXAMPLES 10 to 14--.
Line 28, "A photosensitive" should read --Photosensitive--.
Copolymer in Example 11, "$CH_2$" should read --CH--.

COLUMN 24

Line 66, "[II] in" should read --[II] is provided in--.

COLUMN 25

Line 25, "An image-holding" should read
--An electrophotographic image-holding--.

COLUMN 28

Line 6, "graphs apparatus" should read --graphic apparatus--.

Signed and Sealed this

Thirtieth Day of August, 1994

Attest:

BRUCE LEHMAN

Attesting Officer  Commissioner of Patents and Trademarks